United States Patent Office 3,297,763
Patented Jan. 10, 1967

3,297,763
DERIVATIVES OF DIBENZOCYCLOHEPTENONES
AND PROCESSES THEREFOR
Harry L. Slates, Florham Park, and Norman L. Wendler,
Summit, N.J., assignors to Merck & Co., Inc., Rahway,
N.J., a corporation of New Jersey
No Drawing. Filed Jan. 28, 1964, Ser. No. 340,831
13 Claims. (Cl. 260—590)

This application is a continuation-in-part of our copending application Serial No. 200,039, filed June 5, 1962, now abandoned.

This invention relates to a method for the preparation of dibenzocyclohepten-5-ones. In particular, the invention relates to 5H-dibenzo[a,d]cyclohepten-5-ones which are substituted in either the 10 or 11-positions with a halogen, and a method for preparing the same.

The process provided by the present invention involves the thermal disproportionation of a phosphorus pentahalide addition complex of a 5H-dibenzo[a,d]cyclohepten-5-one, wherein the halogen of the phosphorus pentahalide is either chlorine or bromine, to form the 5,5,10- or 5,5,11-trichloro (or bromo) substituted hydrocarbon which is then hydrolyzed to form the desired 10 or 11-halo ketone. The conditions, namely, temperature and pressure, required to effect the desired disproportionation of the phosphorus pentahalide addition complex of the 5H-dibenzo[a,d]cyclohepten-5-one are very important and will be elaborated upon hereinbelow.

While the process of the invention is particularly suitable for the preparation of 10 or 11-halogen substituted 5H-dibenzo[a,d]cyclohepten-5-ones which are otherwise nuclearly unsubstituted, it may also be utilized for the preparation of those 10 or 11-halo ketones which are additionally substituted in the benzene moieties with one or more substituents providing such substituents are stable under the conditions required for carrying out the process. Thus, for example, the process may be used to prepare 5H-dibenzo[a,d]cyclohepten-5-ones which are nuclearly substituted with one or more groups such as lower alkyl, lower alkoxy, lower alkenyl, halogen, halolower-alkoxy, cyano, loweralkoxycarbonyl, loweralkylmercapto, loweralkylsulfonyl, haloloweralkylsulfonyl, diloweralkoxysulfamoyl and phenyl. Representative end compounds which may be prepared in accordance with this invention include 10-chloro-3-methylsulfonyl-5H-dibenzo[a,d]cyclohepten-5-one,
3,10-dichloro-5H-dibenzo[a,d]cyclohepten-5-one,
10-chloro-3-dimethylsulfamoyl-5H-dibenzo[a,d]cyclohepten-5-one,
10-bromo-3-methyl-5H-dibenzo[a,d]cyclohepten-5-one,
10-bromo-3-methylmercapto-5H-dibenzo[a,d]cyclohepten-5-one,
10-bromo-3-methoxy-5H-dibenzo[a,d]cyclohepten-5-one and 10-bromo-3-cyano-5H-dibenzo[a,d]cyclohepten-5-one.

For purposes of illustration, the preparation of the compound 10-chloro-5H-dibenzo[a,d]cyclohepten-5-one from the phosphorus pentachloride addition complex of 5H-dibenzo[a,d]cyclohepten-5-one may be represented structurally as follows:

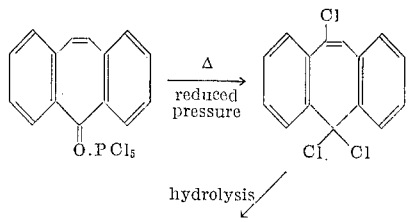

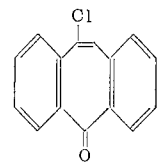

However, as previously indicated hereinabove, the above illustrated process may also be utilized for the preparation of 10 or 11-halo-5H-dibenzo[a,d]cyclohepten-5-ones containing one or more substituents in the benzene moieties from the corresponding phosphorus pentahalide addition complex of the appropriately substituted 5H-dibenzo[a,d]cyclohepten-5-ones.

As illustrated by the reaction scheme above, the first step of the process involves the disproportionation of the phosphorus pentahalide addition complex under such conditions as will provide the desired 5,5,10- or 5,5,11-trihalosubstituted compound. The starting compounds utilized in this step of the process, namely, the phosphorus pentahalide addition complex of 5H-dibenzo[a,d]cyclohepten-5-one and the phosphorus pentahalide addition complex of those 5H-dibenzo[a,d]cyclohepten-5-ones which are further substituted in the benzene moieties with one or more substituents such as mentioned hereinabove, may also be prepared as described in applicants' copending application Serial No. 337,998, filed January 16, 1964.

The disproportionation is desirably effected by heating the phosphorus pentahalide addition complex at an elevated temperature of from about 60° C. to about 160° C. and a pressure of from about 0.5 mm. to about 20 mm. Preferably, an elevated temperature of from 100–160° C. and a pressure of from about 0.01 mm. to about 1 mm. is employed. However, satisfactory results can be achieved employing pressures substantially less than atmospheric pressure, say from about 0.01 mm. to about 300 mm. and at a temperature as low as room temperature. Temperatures greater than 160° C. can be used, but no significant advantage is gained. Furthermore, at higher temperatures sublimation of the trihalogenated compound may occur thereby possibly lowering the yield of the desired 10 or 11-halo substituted ketone. It will be readily appreciated by those skilled in the art that the temperature and pressure are interdependent and that therefore one may be varied depending on the other. Generally, lower temperatures can be utilized when lower pressures are employed. However, it is preferred to employ high temperatures and low pressures to reduce the reaction time. Recovery of the product can be readily accomplished employing conventional techniques. Representative compounds which may be prepared in accordance with step 1 include 3-methylsulfonyl-5,5,10-trichloro-5H-dibenzo[a,d]cycloheptene,
3,5,5,10-tetrachloro-5H-dibenzo[a,d]cycloheptene,
3-dimethylsulfamoyl-5,5,10-trichloro-5H-dibenzo[a,d]cycloheptene,
3-methyl-5,5,10-tribromo-5H-dibenzo[a,d]cycloheptene,
3-methylmercapto-5,5,10-tribromo-5H-dibenzo[a,d]cycloheptene and
3-methoxy-5,5,10-trichloro-5H-dibenzo[a,d]cycloheptene.

The second step of the process involves decomposition of the 5,5,10(11)-trihalogen substituted hydrocarbon by hydrolysis. The hydrolysis may be effected in an aqueous medium. Water alone is sufficient, although it is desirable to employ an aqueous organic solvent such as a water-alcohol mixture or glacial acetic acid to enhance the solubility of the trihalogen substituted compound. The desired end products can be recovered using conventional techniques.

The end products of this invention, namely, the 10 or 11-halogen substituted ketones, are useful for the preparation of various derivatives of dibenzocycloheptenes having the formulae

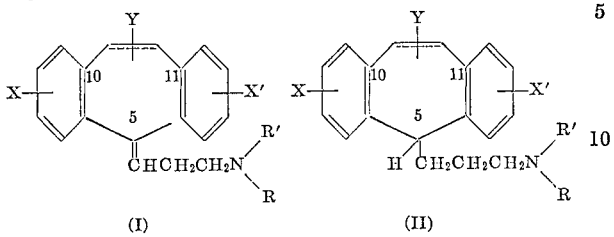

wherein X and X' are selected from the group consisting of lower alkyl, lower alkoxy, loweralkenyl, halogen, haloloweralkoxy, cyano, loweralkoxycarbonyl, loweralkylmercapto, loweralkylsulfonyl, haloloweralkylsulfonyl, diloweralkoxysulfamoyl and phenyl, Y is a halogen having an atomic weight of at least 35 and no greater than 80, R' is hydrogen and R may be hydrogen or an alkyl or alkenyl radical having up to 6 carbons, either straight or branched chain, or cycloalkyl having up to 8 carbons, or an aralkyl group such as benzyl, as described in copending application Serial No. 297,710, filed July 25, 1963, and assigned to Merck & Co., Inc., the assignee of the instant application. The dibenzocycloheptenes disclosed in said application are useful in the treatment of mental disorders, since they are anti-depressants and serve as mood elevators or psychic energizers.

The following examples are given for purposes of illustration and are not to be construed as limiting the invention.

EXAMPLE 1

*10-chloro-5H-dibenzo[a,d]cyclohepten-5-one*

PHOSPHORUS PENTACHLORIDE ADDITION COMPLEX OF 5H-DIBENZO[a,d]CYCLOHEPTEN-5-ONE

To a solution of 25.0 g. of 5H-dibenzo[a,d]-10,11-dihydrocyclohepten-5-one in 2.5 ml. phosphorus oxychloride and 50 ml. dry benzene is added 75 g. phosphorus pentachloride (3 eq.) and the mixture is stirred under reflux for 2.5 hours with protection from moisture. After ca. 15 minutes, a clear red solution results and a crystalline complex slowly separates accompanied by evolution of hydrogen chloride. At the end of the reflux period, the reaction mixture is chilled to 10° C. and the dark red complex is isolated by filtration and washed twice with 25 ml. of dry benzene.

0.5 of the phosphorus addition complex prepared above is heated for one hour at 100° C. in vacuum (0.5 mm.). The cooled reaction product is then triturated with acetic acid to deposit 10-chloro-5H-dibenzo[a,d]cyclohepten-5-one, M.P. 118–121° C.; on recrystallization from methanol, M.P. 125–126° C.

EXAMPLE 2

*5,5,10-trichloro-5H-dibenzo[a,d]cycloheptene*

An intimate mixture of 2.0 g. 5H-dibenzo[a,d]cyclohepten-5-one and 5.0 g. phosphorus pentachloride in an open flask is heated to 160° C. (bath temperature) for 2.5 hours at atmospheric pressure. The phosphorus complex which is thus produced is then heated at 160° C. for 30 minutes in vacuo (0.5 mm.). The residue is subjected to evaporative short path distillation at 180–190° C./0.03 mm. There is obtained 5,5,10-trichloro-5H-dibenzo[a,d]cycloheptene as a pale yellow viscous oil, characterized by its infrared spectra (no carbonyl) and its ultraviolet spectra;

$$\lambda_{max.}^{iso\text{-}octane}\ 230, 261\ \text{and}\ 290\ m\mu$$

We claim:

1. A process for preparing 10-halo substituted and 11-halo substituted 5H-dibenzo[a,d]cyclohepten-5-ones from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to a pressure no greater than about 300 mm., and thereafter hydrolyzing the resulting product.

2. A process for preparing 10-halo substituted and 11-halo substituted 5H-dibenzo[a,d]cyclohepten-5-ones from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to an elevated temperature and to a pressure no greater than about 300 mm., and thereafter hydrolyzing the resulting product.

3. A process for preparing 10-halo-substituted and 11-halo substituted 5H-dibenzo[a,d]cyclohepten-5-ones from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to a temperature of from about room temperature to about 160° C. and a pressure of from about 0.01 mm. to about 300 mm., and thereafter hydrolyzing the resulting product.

4. A process for preparing 10-halo substituted and 11-halo substituted 5H-dibenzo[a,d]cyclohepten-5-ones from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to a temperature of from about 60° C. to about 160° C. and a pressure of from about 0.5 mm. to about 20 mm., and thereafter hydrolyzing the resulting product.

5. A process for preparing 10-halo substituted and 11-halo substituted 5H-dibenzo[a,d]cyclohepten-5-ones from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to a temperature of from about 100° C. to about 160° C. and a pressure of from about 0.01 mm. to about 1 mm., and thereafter hydrolyzing the resulting product.

6. A process for the preparation of 10-chloro-5H-dibenzo[a,d]cyclohepten-5-one from the phosphorus pentahalide addition complex of 5H-dibenzo[a,d]cyclohepten-5-one, wherein the halogen of said pentahalide has an atomic weight of at least 35 and no greater than 80 which comprises subjecting the latter to a temperature of from about room temperature to about 160° C. and a pressure of from about 0.01 mm. to about 300 mm., and thereafter hydrolyzing the resulting product.

7. A process for preparing 5,5,10-trihalo and 5,5,11-trihalo substituted 5H-dibenzo[a,d]cycloheptenes from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to a temperature of from about room temperature to about 160° C. and a pressure of from about 0.01 mm. to about 300 mm.

8. A process for preparing 5,5,10-trihlao and 5,5,11-trihalo substituted 5H-dibenzo[a,d]cycloheptenes from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to a temperature of from about 60° C. to about 160° C. and a pressure of from about 0.5 mm. to about 20 mm.

9. A process for preparing 5,5,10-trihalo and 5,5,11-trihalo substituted 5H-dibenzo[a,d]cycloheptenes from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to a temperature of from about 100° C. to about 160° C. and a pressure of from about 0.01 mm. to about 1 mm.

10. A compound of the formula

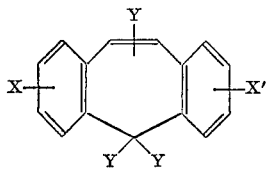

wherein X and X' are selected from the group consisting of lower alkyl, lower alkoxy, lower alkenyl, halogen, haloloweralkoxy, cyano, loweralkoxycarbonyl, loweralkylmercapto, loweralkylsulfonyl, haloloweralkylsulfonyl, diloweralkoxysulfamoyl and phenyl; and Y is a halogen having an atomic weight of at least 35 and no greater than 80.

11. 5,5,10-trichloro-5H-dibenzo[a,d]cycloheptene.

12. A process for preparing 5,5,10-trihalo and 5,5,11-trihalo substituted 5H-dibenzo[a,d]cycloheptenes from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to a pressure no greater than about 300 mm.

13. A process for preparing 5,5,10-trihalo and 5,5,11-trihalo substituted 5H-dibenzo[a,d]cycloheptenes from a phosphorus pentahalide addition complex of a 5H-dibenzo[a,d]cyclohepten-5-one which is unsubstituted at the 10 and 11-positions thereof, and wherein the halogen of the phosphorus pentahalide has an atomic weight of at least 35 and no greater than 80 which comprises subjecting the latter to an elevated temperature and to a pressure no greater than about 300 mm.

References Cited by the Examiner

Cope et al., J. Am. Chem. Soc. 73, 1673–1678 (1951).
Wagner et al., Synthetic Organic Chemistry, page 105, (1953).

LEON ZITVER, *Primary Examiner.*
DANIEL D. HORWITZ, *Examiner.*